(12) United States Patent
Jacobek et al.

(10) Patent No.: US 10,643,281 B2
(45) Date of Patent: May 5, 2020

(54) PRICE TARGET BUILDER

(75) Inventors: Lee Jacobek, San Francisco, CA (US); Holger Berndt, San Francisco, CA (US)

(73) Assignee: Refinitiv US Organization LLC, New York, NY (US)

(*) Notice: Subject to any disclaimer, the term of this patent is extended or adjusted under 35 U.S.C. 154(b) by 63 days.

(21) Appl. No.: 13/566,605

(22) Filed: Aug. 3, 2012

(65) Prior Publication Data

US 2013/0268459 A1 Oct. 10, 2013

Related U.S. Application Data

(60) Provisional application No. 61/621,192, filed on Apr. 6, 2012.

(51) Int. Cl.
*G06Q 40/00* (2012.01)
*G06Q 40/06* (2012.01)

(52) U.S. Cl.
CPC .................... *G06Q 40/06* (2013.01)

(58) Field of Classification Search
CPC ........................................ G06Q 40/00
USPC ........................ 705/35, 36 R, 36 A
See application file for complete search history.

(56) References Cited

U.S. PATENT DOCUMENTS

| 7,496,531 | B1 | 2/2009 | Gastineau et al. | |
| 2004/0254872 | A1* | 12/2004 | Grzebeta | G06Q 40/06 705/36 R |
| 2005/0209948 | A1* | 9/2005 | Ballow | G06Q 10/06 705/36 R |
| 2006/0015425 | A1* | 1/2006 | Brooks | G06Q 40/00 705/35 |
| 2006/0277132 | A1* | 12/2006 | Brooks | 705/35 |
| 2007/0083455 | A1 | 4/2007 | Bove et al. | |
| 2007/0143200 | A1* | 6/2007 | Muller et al. | 705/36 R |
| 2010/0216545 | A1* | 8/2010 | Lange et al. | 463/26 |
| 2011/0246350 | A1* | 10/2011 | Glinberg | G06Q 40/00 705/37 |

FOREIGN PATENT DOCUMENTS

| CN | 104321800 A | 1/2015 |
| EP | 2 834 785 A1 | 2/2015 |
| WO | 2013/151844 A1 | 10/2013 |

OTHER PUBLICATIONS

Top US Bank Holding Company Financial Analysis American Banker [New York, N.Y] Mar. 25, 1998: 10. (Year: 1998).*
Bradford et al., "Digital Statutory Supplements for Legal Education: A Cheaper, Better Way," Jan. 1, 2010, www.digitalcommons.unl.edu.

(Continued)

*Primary Examiner* — Bruce I Ebersman
*Assistant Examiner* — John A Anderson
(74) *Attorney, Agent, or Firm* — Norton Rose Fulbright US LLP

(57) ABSTRACT

Systems and techniques for determining price targets are disclosed. The systems and techniques are designed to be a key workflow tool for investment managers and analysts, saving time and improving investment discipline. Using the disclosed systems and techniques, price targets may be generated based on historic, forward looking, and/or relative valuation metrics which are applied to actual or estimated financial data.

19 Claims, 10 Drawing Sheets

(56) References Cited

OTHER PUBLICATIONS

International Search Report and Written Opinion of the International Searching Authority issued for the corresponding PCT International Application No. PCT/US13/34102 dated Jun. 13, 2013.
First Office Action dated Dec. 14, 2016, issued in corresponding Peoples Republic of China Patent Application No. 201380019004.8.
Office Action dated Jan. 25, 2017, issued in corresponding European patent application No. 13772932.3, 7 pages.
Second Office Action issued by the State Intellectual Property Office (SIPO) of China dated Aug. 11, 2017, in connection with corresponding Chinese Patent Application No. 201380019004.8, 18 pages.
Response to Office Action dated Jul. 27, 2017 filed in corresponding European patent application No. 13772932.3, 11 pages.
Summons to attend oral proceedings pursuant to Rule 115(1) EPC, dated Nov. 28, 2017, issued in corresponding corresponding European patent application No. 13772932.3, 11 pages.
International Preliminary Report on Patentabiiity issued for the corresponding PCT International Application No. PCT/US2013/034102 dated Oct. 16, 2014, 7 pages.

* cited by examiner

Dropdown with the following options:

PRICE TARGET BUILDER

CROSS-REFERENCE TO RELATED APPLICATION

This application claims priority to U.S. Provisional Application No. 61/621,192 filed Apr. 6, 2012, entitled 'Price Target Builder', the content of which is incorporated herein in its entirety.

TECHNICAL FIELD

This disclosure relates to price targets, and more particularly to systems and techniques for determining price targets.

BACKGROUND

Generally, a price target is an estimate of the future price of an investment asset. In the equity market, price targets are typically generated by analysts and refer to the price level at which an analyst believes a given security will rise or fall over a particular period of time.

Price targets are considered a key to maximizing return on investment assets, but can also be notoriously difficult to maintain. Typically, a price target based farther in the future has more uncertainty than one based on a shorter time frame. In addition, approaches to deriving price targets run the gamut from using detailed valuation models to relatively simple market multiples. For example, in some instances, investment firms blend elements of market multiple to "triangulate" their way to an optimal price target. As such, price targets tend to be labor-intensive to establish, and even more difficult to maintain and monitor as investment prospects and market conditions change over time.

Accordingly, there is a need for systems and techniques to improve the generation and maintenance of price targets.

SUMMARY

Systems and techniques for determining price targets are disclosed. The systems and techniques are designed to be a key workflow tool for investment managers and analysts, saving time and improving investment discipline. Using the disclosed systems and techniques, price targets may be generated based on historic, forward looking, and/or relative valuation metrics which are applied to actual or estimated financial data.

Various aspects of the systems and techniques relate to applying one or more valuation metrics to an investment to compute a price target, and automatically updating the computed price target based on subsequent changes to the one or more valuation metrics.

For example, according to one aspect, a computer-implement method includes identifying, from a first physical memory location of a computer memory, a first set of valuation metrics for association with an investment asset. The first set of valuation metrics is associated with a first set of values. The method includes applying, from a second physical memory location of the computer memory, a second set of values associated with a second set of valuation metrics associated with the investment asset to the first set of values to compute a price target for association with the investment asset, and computing automatically an updated price target for association with the investment asset upon a change in value of either the first set of values or the second set of values. The method also includes storing the updated price target in a third memory location of the computer memory.

In another aspect, a computer-implemented method includes defining at least one configurable financial relationship underlying a price target, the price target associated with a financial asset, monitoring the at least one financial relationship for a change in value, and updating the price target associated with the financial asset based on the change in value.

The systems and techniques disclosed herein may be utilized to compute price targets from relative valuation multiples. Intrinsic valuation and user-defined valuation models may also be utilized to compute price targets.

For example, in one embodiment, computing a relative valuation-based price target includes a two-step process. One step of the process includes identifying a first set of valuation metrics from a group of common ratios, such as earnings, sales, enterprise value, cash flow, book value, and dividends. Each item of the set of valuation metrics may be associated with a security selection, a peer security, or an industry identifier, as well as a timeframe.

A second step of the process includes associating a corresponding second set of valuation metrics (e.g., estimate data and fundamental company data) with the first set of valuation metrics in a rule. The rule defines a financial mathematical relationship that is used in computing a price target. In one embodiment, values of the selected valuation metric, corresponding financial data, and computed resulting target price are provided to the user for display on a user display device. A projected change in value also may be computed by comparing a current market price for the investment to the computed target price and determining a difference value. In one embodiment, the determined difference value is computed in percentage terms and is provided to the user for display.

In one embodiment, one or more selectable options are provided to fine tune each input data value (e.g., identified first and second sets of valuation metrics) used to generate the price target. Additionally, embodiments of the present disclosure utilize multiple sets of valuation metrics and therefore, use multiple rules to compute a price target. Each item of the sets of valuation metrics may be individually weighted by the user or automatically weighted by the system to arrive at a blended price target value.

Additional systems, methods, as well as articles that include a machine-readable medium storing machine-readable instructions for implementing the various techniques, are disclosed. Details of various implementations are discussed in greater detail below.

In some embodiments, one or more of the following advantages may be present. For example, the system may apply current or historical valuation ratios associated with a stock, stock peer group, stock sector, industry, country, index to estimates of earnings, revenue, earnings before income before interest and taxes and depreciation and amortization (EBITDA), or other metrics to compute a price target.

The system may also apply historical premium or discount versus peer group, sector, industry, country, or index metric values to current peer/sector/industry/country/index multiples and estimates of earnings, revenue, and EBITDA values to compute a price target.

Additional advantages may also be obtained from the present disclosure. For example, one advantage may relate to computing blended price targets. The system may combine multiple rules to produce a blended price target, which may include intrinsic valuation and/or valuation model outputs, and allows for blending of computed price targets with other price target information computed using relative valuation techniques. The blended price targets may then be automatically updated as prices, earnings, estimates, and valuation multiples of the investment asset being analyzed and its peers/industry/sector/country/index change.

Another advantage may relate to visualization. For example, in one embodiment, a user of the system may be provided a display showing a history (graphically or textually) of how one or more computed price targets based on a set of rules have changed over a time interval.

Other advantages obtainable from the present disclosure may include ease of use, flexibility to derive target prices, transparent calculations, and an ability to continuously update price targets based on configurable financial relationships defined among input data.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

Figure 1:
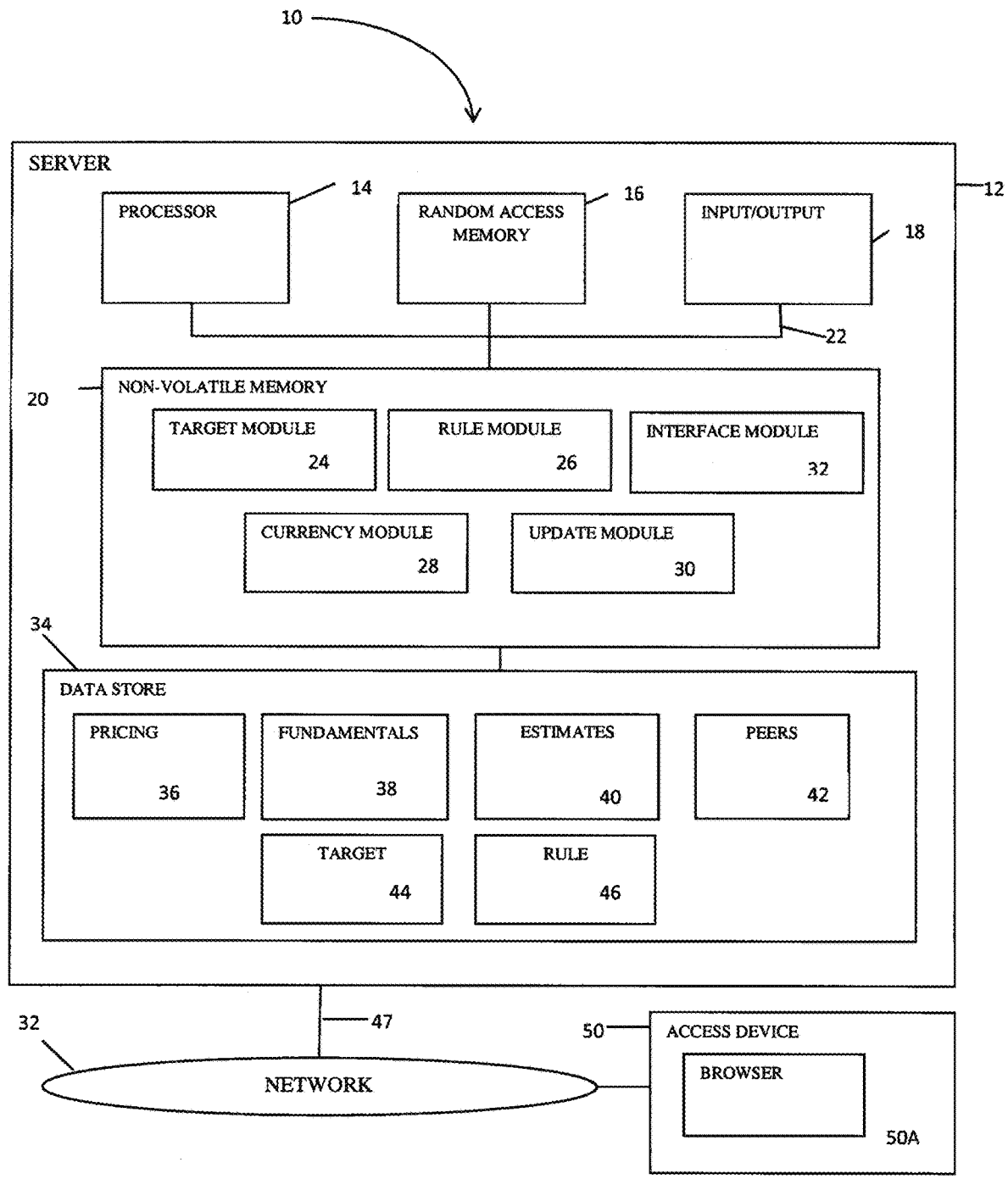
FIG. 1 is a schematic of an exemplary computer-based system for computing a price target.

FIG. 1 illustrates a computing system 10 within which embodiments of the present disclosure may be implemented. The computing system 10 is only one example and is not intended to suggest any limitation as to the scope of use or functionality of the invention. The computing system 10 should not be interpreted as having any dependency or requirement relating to any one or combination of illustrated components.

For example, a suitable computer system may be operational with numerous other general purpose or special purpose computing consumer electronics, network PCs, minicomputers, mainframe computers, laptop computers, as well as distributed computing environments that include any of the above systems or devices, and the like.

The systems and techniques may be described in the general context of computer-executable instructions, such as program modules, being executed by a computer. Generally, program modules include routines, programs, objects, components, data structures, loop code segments and constructs, etc. that perform particular tasks or implement particular abstract data types. The modules may be implemented in distributed computing environments where tasks are performed by remote processing devices that are linked through a communications network. In a distributed computing environment, program modules are located in both local and remote computer storage media including memory storage devices. Tasks performed by the programs and modules are described below with the aid of figures. Those skilled in the art can implement the description and figures as processor executable instructions, which can be written on any form of a computer readable media.

In one embodiment, with reference to FIG. 1, the system 10 includes a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14.

As shown in FIG. 1, in one embodiment, the non-volatile memory 20 is configured to include a target module 24 for computing at least one price target for an investment asset. Example investment assets include, but are not limited to, stocks, bonds, futures, options, currencies, and other types of publicly and privately held investment securities. The price target may be based on a configurable rule that defines a financial relationship between sets of valuation metrics associated with the investment asset.

A rule module 26 is provided for generating and storing one or more configurable rules (e.g., definitions describing mathematical financial relationships between at least one item of a first set of valuation metrics and a corresponding item of a second set of valuation metrics) that are used by the target module 24 to compute a price target. For example, in one embodiment, the rule module 26 generates and stores a rule in the set of rule data 46 that defines multiplying at least one item of a first set of valuation metrics with an item included in a second set of valuation metrics. The rule module 26 may also define a weighting for association with each item of the set of first and second valuation metrics included in a rule, and generate and store text describing the generated rule in the set of rule data 46.

Interface module 32 provides a graphical user interface (GUI) for selecting and displaying valuation metrics and computed price targets. Example graphical user interfaces provided by the interface module 32 are shown and discussed in connection with FIGS. 3-9, 10B-11 and 13.

Currency module 28 processes currency (e.g., an accepted medium of exchange) mismatches between computed target prices and price currencies. The currency module 28 may be executed when estimate and/or fundamental data values are obtained in a first currency and target prices are computed in a second currency. In one embodiment, once the target module 24 computes a price target in a first currency, the currency module 28 converts the computed price target from the first currency to a second currency reflecting the currency in which the investment asset trades.

Update module 30 monitors and automatically invokes the target module 24 to compute updated price targets based on any change in valuation metrics underlying a rule. Additional details of the various modules are discussed in connection with FIGS. 2-12.

As shown in FIG. 1, in one embodiment, network 32 includes various devices such as routers, server, and switching elements connected in an Intranet, Extranet or Internet configuration. In one embodiment, the network 32 uses wired communications to transfer information between an access device 50, the server device 12, and a data store 34. In another embodiment, the network 32 employs wireless communication protocols to transfer information between the access device 50, the server device 12, and the data store 34. In yet other embodiments, the network 32 employs a combination of wired and wireless technologies to transfer information between the access device 50, the server device 12, and the data store 34.

The access device 50 can include a personal computer, laptop computer, or other type of electronic device, such as a cellular phone or Personal Digital Assistant (PDA). In one embodiment, for example, the access device 50 is coupled to I/O devices (not shown) that include a keyboard in combination with a pointing device such as a mouse for sending web page requests to the server device 12. Preferably, memory of the access device 50 is configured to include a browser 50A that is used to request and receive information from the server device 12. Although only one access device 50 is shown in FIG. 1, the system 10 can support multiple access devices.

The data store 34 is a repository that maintains and stores information utilized by the before-mentioned modules 24, 26, 28, 30 and 32. In one embodiment, the data store 34 is a relational database. In another embodiment, the data store 34 is a directory server, such as a Lightweight Directory Access Protocol ('LDAP'). In yet another embodiment, the data store 34 is an area of non-volatile memory 20 of the server device 12.

As shown in FIG. 1, in one embodiment, the data store 34 includes a set of pricing data 36. As used herein, the words 'set' and 'sets' refer to anything from a null set to a multiple element set.

The set of pricing data 36 may be quote and trade-related data associated with equity, fixed income, financial derivatives, currency, and other investment instrument types. The set of pricing data 36 may include current as well as historical security pricing information associated with one or more of the above-mentioned investment types. In one embodiment, the set of pricing data 36 includes a real-time data feed of security asset prices as well as historical security asset prices.

A set of fundamentals data 38 may also be provided. The set of fundamentals data 38 may include fundamental company data, such as inventory turnover, earnings, sales, dividends, and similar items, associated with a particular tradable security, regardless of market liquidity, as well as index, sector, and other tradable security data.

As shown in FIG. 1, the data store 34 includes a set of estimates data 40. The set of estimates data 40 includes consensus company earnings forecasts and recommendations for investment assets. In one embodiment, the set of estimates data 40 includes broker estimates, such as Thomson Reuters Smart Estimates, which indicate the direction of earnings surprises for assets. In another embodiment, the set of estimates data 40 also includes Thomson Reuters Smart Targets, which indicate the likelihood that a firm will purchase or sell a given asset based on the fund's historical purchasing activity and profile. In yet another embodiment, the set of estimates data 40 includes proprietary estimates generated by the user or a firm. In yet another embodiment, the set of estimates data 40 includes a combination of broker estimates and proprietary estimates.

A set of peer data 42 is also provided that, for a given investment asset, defines a default set of investment assets having similar characteristics. For example, in the context of equity markets, the set of peer data 42 may be based on analyst coverage overlap and/or be user-defined. Example user-defined based criteria may include companies in a same industry or having a similar market capitalization or sales as the investment asset for which a price target is desired.

As shown in FIG. 1, in one embodiment, the data store 34 includes a set of valuation data 43. The set of valuation data 43 is a repository for analytic information computed by the target module 24 on the basis of data derived from one or more sets of pricing data 36, fundamentals data 38, estimates data 40 and peers data 42. For example, in one embodiment, content of the set of valuation data 43 includes computed time series Price/Earnings (P/E) ratios derived from the set of pricing data 36 and the set of fundamentals data 38. The set of valuation data 43 may include a valuation time series (e.g., single-security and various benchmark indices) and/or current and historical benchmark valuation ratios (e.g., historical median and/or aggregate value) that may be utilized in generating a price target.

In addition, a set of price target data 44 is provided that serves as a repository to store and access computed and updated price target information. The set of price target data 44 may be configured to be shared with more than one user or be limited in access to a single user of the system. A set of rule data 46 is also provided that serves as a repository for configurable rules (e.g., algorithmic formulas) used to compute price targets for investment assets. Similar to the set of price target data 44 described previously, rules included in the set of rule data 46 may be shared with more than one user or be limited in access to a single user of the system using a set of access permissions. The set of access permissions may be implemented using standard database access and permission techniques as known in the art. Additional details concerning information included in the data store 34 are discussed in greater detail below.

Although the data store 34 shown in FIG. 1 is directly connected to the network 32 via link 47, it will be appreciated by one skilled in the art that the data store 34 and/or any of the information shown therein, can be distributed across various servers and be accessible to the server 12 over the network 32, be coupled directly to the server 12, or be configured in an area of non-volatile memory 20 of the server 12.

Further, it should be noted that the system 10 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
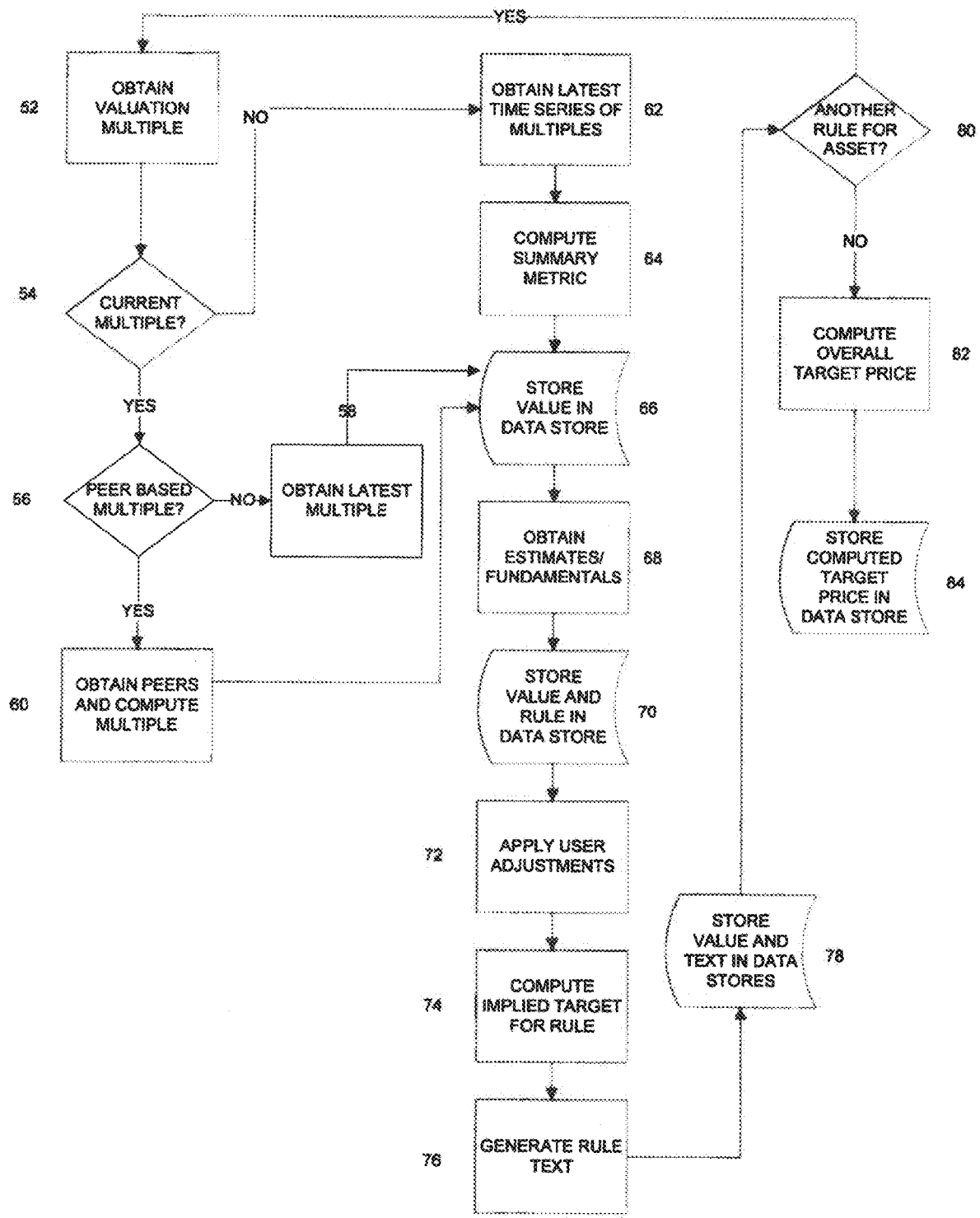
FIG. 2 illustrates an exemplary method for computing updating a price target.
Figure 3:
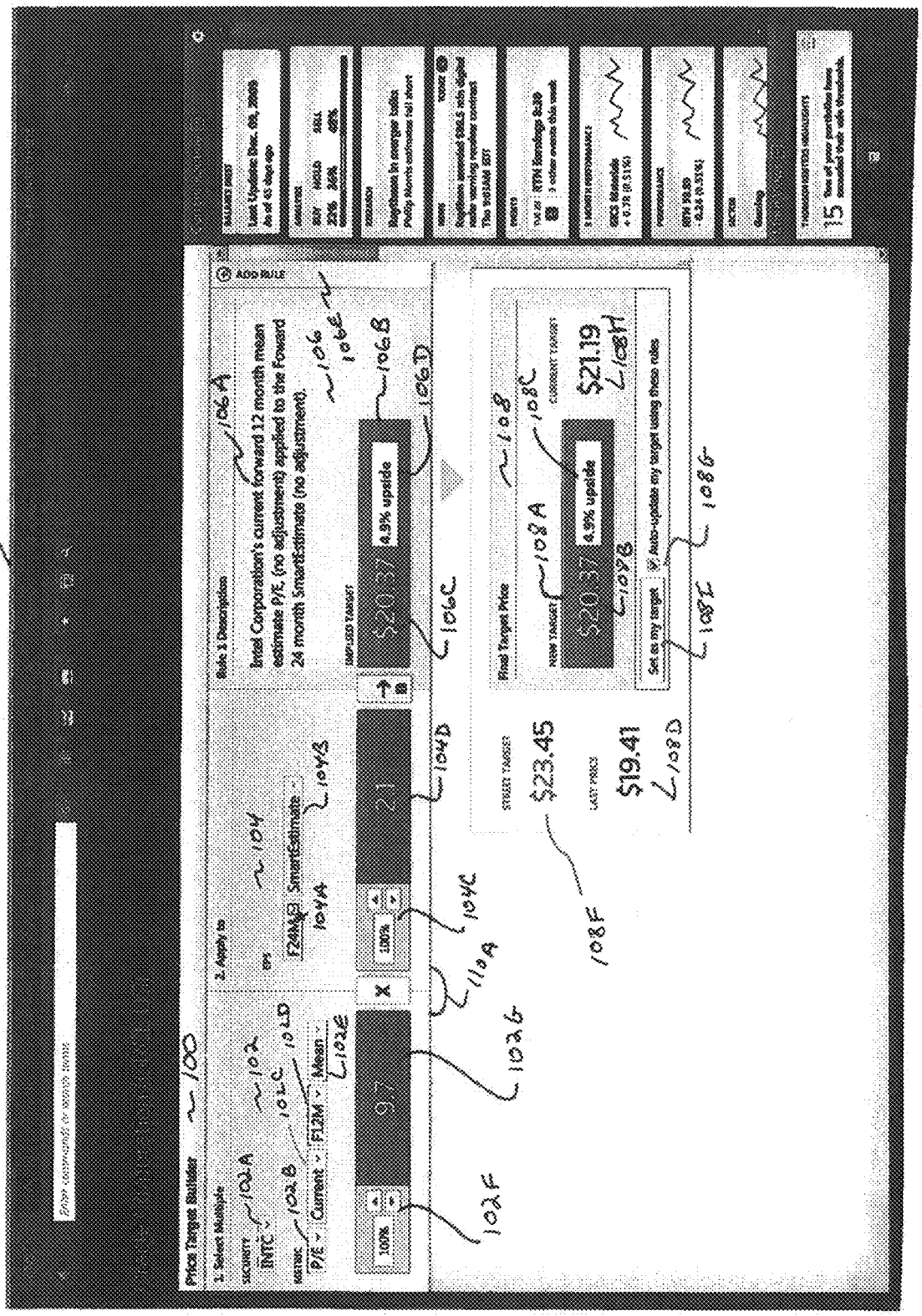
FIGS. 3-13 illustrate an example graphical user interface and data mappings used in connection with the system shown in FIG. 1.

FIG. 2 discloses an example method of computing a price target for an investment asset using one or more rule. With reference to FIG. 3, steps 52-80 are optionally repeated for each rule defined for an investment asset. Once all defined rules are evaluated for the investment asset, overall target prices are computed and stored, as shown at steps 82 and 84.

For example, as shown in FIG. 2 at step 52, the target module 24 first obtains a valuation multiple to be associated with an investment asset for which a price target is desired. The investment asset for which a price target is to be computed is hereinafter referred to as a focus security. The valuation multiple may relate to the focus security or alternatively, a peer security. Example valuation multiples include, but are not limited to, the following ratios: price/earnings (P/E), price/cash flow, price/sales, price/book, enterprise value/earnings before interest, taxes, depreciation and amortization (EV/EBITDA), dividend yield, Price/Earnings to Growth (PEG), Enterprise Value to Sales (EV/Sales) and Price to Intrinsic Value (PVA). In one embodiment, as discussed in connection with FIGS. 3-4, the interface module 32 provides a graphical user interface for prompting a user to select a valuation multiple. Upon selection, the valuation multiple is accessed by the target module 24. The target module 24 may also automatically select the valuation multiple if the valuation multiple is already defined in a rule associated with the focus security, as discussed below.

Next, at step 54, the target module 24 determines whether the valuation multiple is a current or historical valuation multiple. If the valuation multiple is a historical valuation multiple, at step 62, the target module 24 obtains the latest time series associated with the valuation multiple from one or more sets of data in the data store 34. The target module 24, at step 64, then computes a summary metric 64 of the latest time series and stores the summary metric in the set of valuation data 43 in the data store 34. The summary metric may be a historic median or aggregate value computed from the time series.

If the valuation multiple obtained at step 52 is a current multiple, at step 56, the target module 24 determines whether the current multiple is peer-based (e.g., based one or more assets having similar characteristics). If the current multiple is peer-based, at step 60, the target module 24 identifies the one or more assets having similar characteristics, hereinafter referred to as peers, to the focus security from the set of peers data 42 and computes an overall peer metric value based on valuation multiples associated with each of the peers. The target module 24, at step 66, then stores the computed overall peer metric value in the valuation data set 43 of the data store 34. Otherwise, if the current multiple is not peer-based, at step 58, the target module 24 obtains the most recent value associated with the current multiple, and at step 66, stores the value of the current multiple value in the valuation data set 43 of the data store 34.

Next, at step 68, the target module 24 obtains estimate data and/or fundamentals data associated with the focus security. In one embodiment, once the target module 24 obtains the valuation multiple and estimate data and/or fundamental data from the data store 34, the rule module 26 is invoked by the target module 24 to generate a configurable rule representing a financial mathematical relationship between the obtained valuation multiple and the obtained estimates and/or fundamental data. In one embodiment, the rule generated is a formula indicating that the obtained valuation multiple is to be multiplied by the obtained estimate and/or fundamental data value to compute an implied target price for the focus security. As used herein the phrases "implied target price" and "implied price target" refer to a computed price target derived from a single rule. Of note, multiple rules may be generated for a focus security. Further, it will be appreciated by one skilled in the art that the rule module 26 is not limited to a multiplication implementation and that other additional algorithmic techniques may be defined in rules generated by the rule module 26.

Once the rule module 26 generates a rule, the target module 24 stores the value of any obtained estimates and/or fundamental data in the set of valuation data 43, associates the generated rule with the focus security, and stores the generated rule in the set of rule data 46, as indicated at step 70. Next, as shown in steps 72 and 74, respectively, the target module 24 applies defined weightings to the obtained valuation multiple and/or estimate and fundamental data values, and computes an implied target price for the focus security using the rule. Weightings may be system defined based on investment asset type and/or user defined and associated with generated rules.

Once an implied target price is computed, at step 76, the rule module 26 generates a textual description of the rule used to generate the implied target price. In one embodiment, the rule module 26 generates the textual description from selections the user has made to define the rule and updates the textual description to reflect changes the user may make to the rule. For multiple rules, the rule module 26 associates a rule number with the textual description. Next, at step 78, the target module 24 stores the computed implied target price and the rule module 26 stores the textual description of the rule in the data store 34. The target module 24, at step 80, then determines whether additional rules associated with the focus security are defined in the system. If additional rules are defined, the target module 24 computes additional implied target prices for the focus security using the before-mentioned techniques described in steps 52-78. Once all of the rules associated with a focus security have been invoked to compute additional implied price targets, at step 82, the target module 24 computes an overall computed target price based on the implied price targets. This may include averaging the computed implied price targets together and/or weighting one or more computed implied price targets differently than other computed implied price targets. Lastly, at step 84, the target module 24 stores the overall computed target price in the price target data set 44.

In one embodiment, once the overall target price is computed, the before-mentioned update module 30 monitors the valuation multiples, estimates and/or fundamental values utilized in one or more rules. The monitoring may include determining whether a change in value has occurred in either a valuation multiple, estimate, or fundamental value. Once a change in value is detected, the target module 24 automatically re-computes one or more implied and overall price targets due to the change in value. In one embodiment, this is implemented by initially storing state information, such as date and time values, with each valuation multiple, estimate and/or fundamental data, and subsequently invoking the target module 24 to compute the overall computed target price upon a change in value. In another embodiment, a batch process is invoked by the update module 30 to access the latest data for valuation multiple values, estimate values, and fundamental values.

Turning now to FIG. 3, an example graphical user interface (GUI) 100 provided by the interface module 32 is disclosed. The GUI 100 may be utilized by a user of the system to select valuation metrics to form one or more rule and display generated target prices. As shown in the FIG. 3 example, the GUI 100 may be included in an overall suite of investment management tools 101, such as Thomson Reuters' Eikon product. Alternatively, the GUI 100 may be provided as part of a standalone investment management tool.

The example shown in FIG. 3 illustrates a computed final target price for an equity investment. The computed final target price, along with intermediary computations, may be stored in a central proprietary data store for use throughout the investment management tool. As discussed herein, an investment asset for which a price target is desired is also referred to as a focus security. As such, the example focus security shown in the FIG. 3 example is "Oracle Corporation (ORCL US)".

In one embodiment, as shown in FIG. 3, the GUI 100 includes a valuation pane 102 for selecting a first valuation multiple to be used in a rule, an estimate pane 104 for selecting a second valuation multiple, such as an estimate or fundamental metric, to be used in the rule, and an implied target pane 106 for displaying an implied price target generated using the rule. A final target pane 108 also is provided that displays computed overall target prices for investment assets based on one or more computed implied price targets. Details of each of the panes 102-108 are discussed in detail below.

The valuation pane 102 includes a plurality of valuation pull-down options 102A-E that allow a user to select from various valuation metrics that may be stored in a rule and used to generate a target price. Example valuation metrics include absolute valuation multiples, such as P/E, EV/EBITDA, Price/Cash Flow, Price/Sales, Price/Book, Dividend Yield, PEG, EV/Sales, PVA, as well as relative valuation multiples, such as ratios relating to benchmark securities, industries, and sectors. A multiple spinner control 102F and multiple window 102G are also provided for weighting valuation values and displaying weighted valuation values, respectively. As shown in the FIG. 3 example, weighting percentages may be set by toggling the multiple spinner control 102F.

As shown in the FIG. 3 example, in one embodiment, the valuation pane 102 includes a security option 102A that allows a user to select an investment asset other than the focus security. For example, as shown in the FIG. 3 example, the stock "INTC" is selected. Values available for selection under the security option 102A include, but are not limited to, the focus security, peer security, benchmarks and indices. Once a security is selected under the security option 102A, a plurality of valuation metrics associated with the selected security may be made available to the user for selection. For example, as shown in FIG. 3, the current twelve (12) month mean P/E value for INTC is selected as a first valuation metric to be used in computing the price target. The P/E value is then subsequently displayed in the multiple window 102G. If the percentage value set by a multiple spinner control 102F (described below) differs from one-hundred percent (100%), the weighted P/E value is displayed in the multiple window 102G.

The estimate pane 104 includes a plurality of estimate pull-down lists 104A-B that allow the user to select various estimate and/or fundamental metrics associated with the focus security and which may be stored in the rule and used to generate the target price. As shown in the FIG. 3 example, an estimate spinner control 104C and estimate window 104D may also be provided for weighting estimate and/or fundamental data and displaying estimate and/or fundamental data, respectively.

Once a valuation multiple is selected from the valuation pane 102 and an estimate and/or fundamental metric is selected from the estimate pane 104, the rule module 26 stores the rule in the set of rule data 46. The target module 24 then executes the stored rule and provides a computed target price to the implied target pane 106.

In one embodiment, the implied target pane 106 includes a rule description portion 106A, an implied display portion 106B, and an add-rule option 106E. The rule description portion 106A is used to display a textual description of the rule stored in the set of rule data 46. For example, as shown in the FIG. 3 example, the rule description portion 106A includes generated text by the rule module 26 that indicates that Intel Corporation's current forward twelve (12) month mean estimate P/E (no adjustment) is being applied to the forward twenty-four (24) month SmartEstimate (no adjustment), as neither the mean estimate P/E nor SmartEstimate is weighted.

The implied display portion 106B displays the computed implied target price 106C upon the target module 24 executing the rule. For example, as shown in FIG. 3, the rule defines multiplying the first valuation multiple value, "9.7", by the second valuation multiple value, "2.1", to compute the implied target price for the focus security of "$20.37". In one embodiment, in addition to displaying the computed implied target price 106C, the implied display portion 106B also includes a display label 106D indicating whether the computed implied target price 106C is greater than or less than the current market price of the focus security.

For example, as shown in the FIG. 3 example, in one embodiment, after the target module 24 computes the implied target price, the target module 24 computes a percentage price difference between the computed implied target price and current price of the focus security. If the computed implied target price 106C exceeds a last price (e.g., current market price) of the focus security, the computed percentage price difference and text label "Upside" are displayed in the implied display portion 106B. If the computed implied target price 106C is less than the last price 108D of the focus security, the computed percentage price difference and text label "Downside" are displayed in the implied display portion 106B. Otherwise, no label is displayed with the computed percentage difference. As shown in the FIG. 3 example, the computed implied target price is "$20.37", which represents a "4.9%" upside over the last price of "19.41", shown in the final target pane 108.

The add-rule option 106E allows a user to define additional rules for association with a focus security. An example of a computed overall price target based on multiple rules is shown and described in connection with FIG. 4.

The final target pane 108 displays computed overall target prices that may be based on one or more rule. As shown in the FIG. 3 example, the final target pane 108 includes a final display portion 108A for displaying a computed overall price target 108B and an overall display label 108C indicating whether the computed overall price target 108B is greater than or less than the last price 108D associated with the focus security.

In one embodiment, the final target pane 108 also includes a street target price 108E (e.g., a mean target price based on estimates from a number of Wall Street investment firms) and if available (e.g., previously computed), a current target 108F representing a prior computed overall price target for the focus security.

As shown in the FIG. 3 example, in one embodiment, the final target pane 108 also includes an auto-update radio box 108G that, once selected, causes the update module 30 to monitor and automatically cause the target module 24 to compute updated implied and overall target prices upon a change in rule or rule values associated with the focus security. A set target button 108H is also provided that, once selected, stores the computed overall price target as the current target for the focus security.

Figure 4:
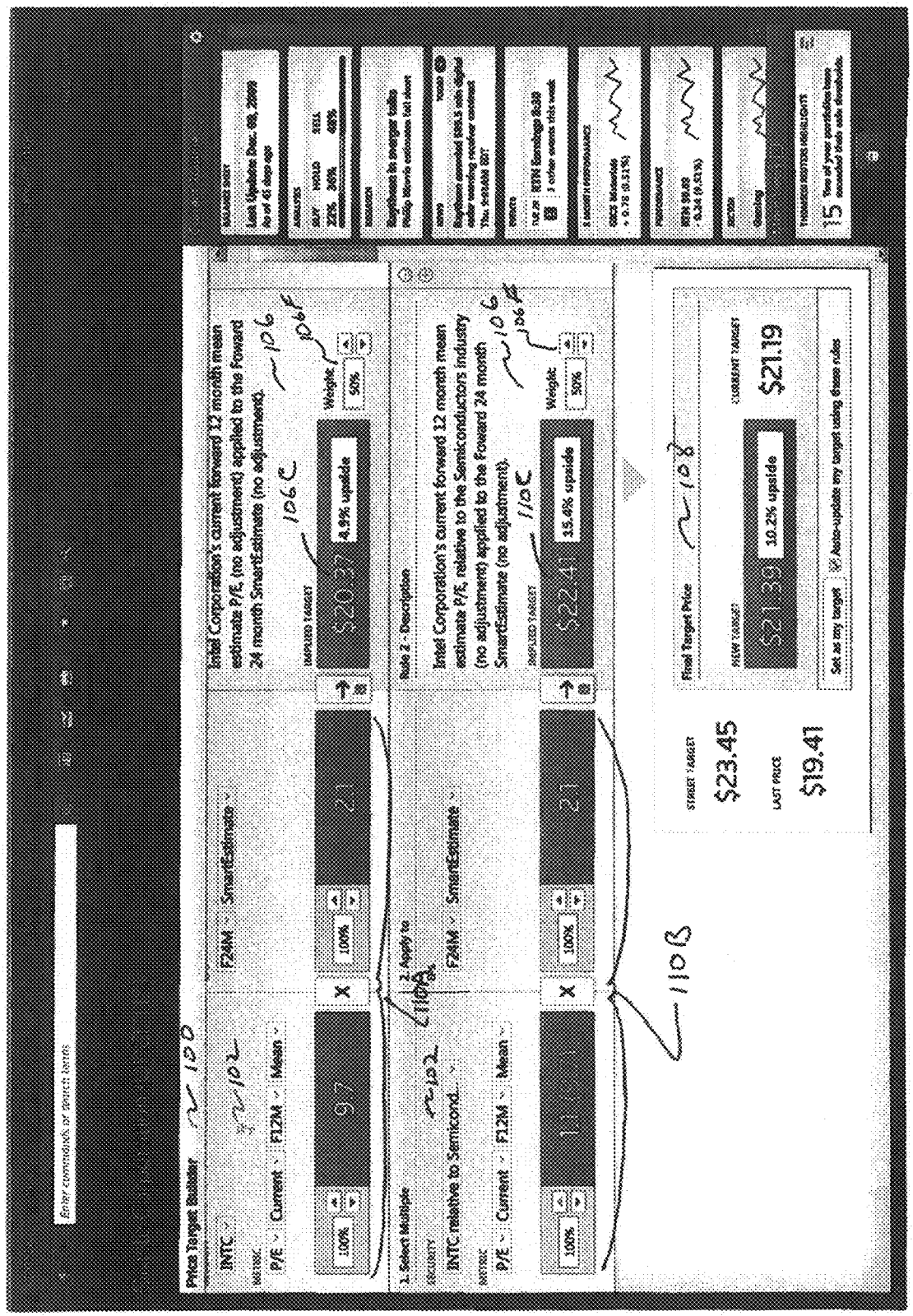

FIG. 4 illustrates another instantiation of the GUI 100 shown in FIG. 3. As shown in the FIG. 4 example, various sets of valuation metrics (e.g., absolute metrics 110A and relative valuation metrics 110B) may be selected and associated with one another to form one or more rules. Each formulated rule 110A and 110B may then be executed by the target module 24 to compute implied target prices 106C and 110C. In one embodiment, as shown in FIG. 4, the computed implied target prices 106C and 110C may be weighted and summed together to compute an overall price target, which is displayed in the final target pane 108.

In one embodiment, for each defined rule, the interface module 32 provides an implied target pane 106 that includes a target spinner control 106F (described below) allowing a user to specify a weight value to apply to each computed implied price target price. For example, as shown in the FIG. 4 example, the target spinner control 106F of each implied target pane 106 is set to fifty percent (50%) indicating to the target module 24 and/or update module 30 that only 50% of the computed implied price target is to be used in computing the overall price target for the focus security. The final target pane 108 shown in FIG. 4 displays a computed overall target price based on multiple computed implied price targets 106C, 110C.

Referring to FIGS. 3 and 4, in one embodiment, value adjustments made by the multiple spinner control 102F, estimate spinner control 104C, and target spinner control 106F are in increments of one (1) with a minimum value of one (1) and a maximum value of one-hundred (100). Each spinner control 102F, 104C, 106F may also include a text box allowing the user to type over values to change or set previous settings.

Figure 5A:
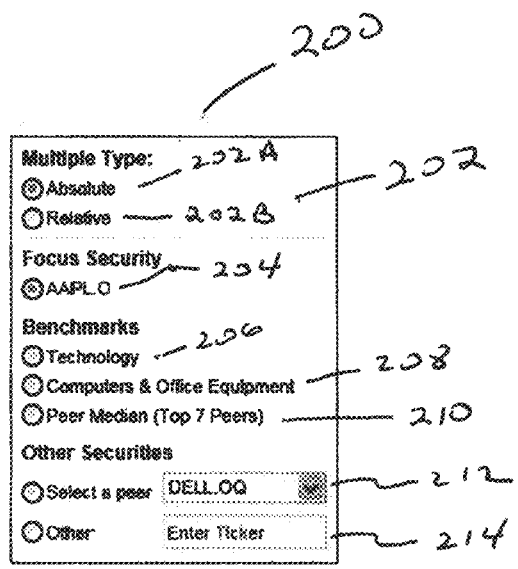
Figure 5B:
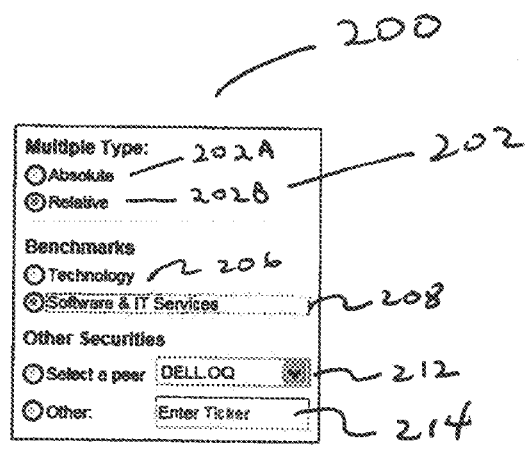

Referring now to FIGS. 5A-5B, a pop-up dialog box 200 provided by the interface module 32 is disclosed. The pop-up dialog box 200 allows a user to select a valuation multiple type, hereinafter referred to as a mode, for inclusion in a rule. As shown in the FIG. 5A example, in one embodiment, a multiple type radio box 202 is provided that allows selection of an absolute mode 202A or a relative mode 202B. Mode selections made in the pop-up dialog box 200 are indicated in the valuation pane 102 discussed in connection with FIGS. 3 and 4. Referring to FIG. 4, 110A illustrates an absolute mode selection and 110B illustrates a relative mode selection.

Figure 6:
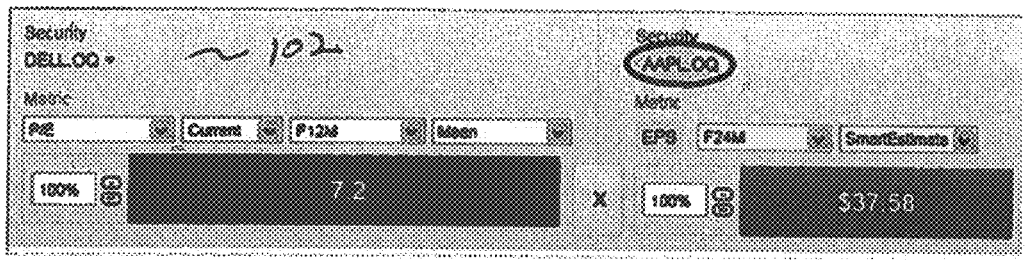

Referring back to FIG. 5A, in one embodiment, upon selection of the absolute mode 202A, the source for the valuation multiple is determined. The source may be the focus security 204 ("AAPL.O") itself, or alternatively, a sector 206, an industry 208 or peer median 210 (with the number of peers shown in parenthesis) identifier. As shown in the FIG. 5A example, in one embodiment, the pop-up dialog box 200 also may include a dropdown list 212 allowing the user to optionally select one of a plurality of peer securities ("DELL.OQ" in the FIG. 5A example) to be used as the valuation source, as well as a free form text field 214 for specifying a security identifier, such as a Reuters Instrument Code (RIC), as the valuation source. Once a valuation source is identified, the valuation source is set to the security option 102A value set in the valuation pane 102. For example, FIG. 6 shows an example of the peer security "DELL.OQ" having been selected as the valuation source from the pop-up dialog box 200 and subsequently being used for valuation multiple values in the valuation multiple pane 102.

Referring to FIG. 5B, upon selection of the relative mode 202B, the focus security 204 and peer median 210 shown in connection with FIG. 5A are not displayed in the pop-up dialog box 200 while other options shown in connection with FIG. 5A remain available for selection.

Figure 7:
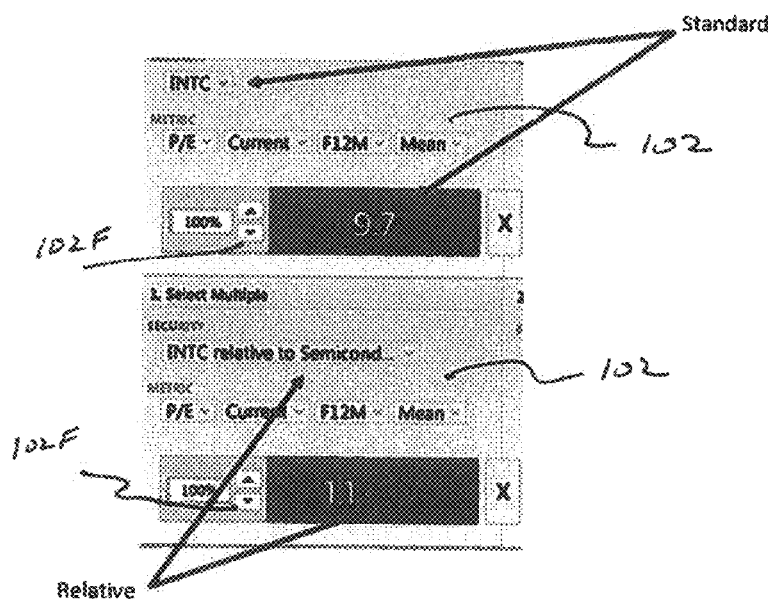
Figure 8:
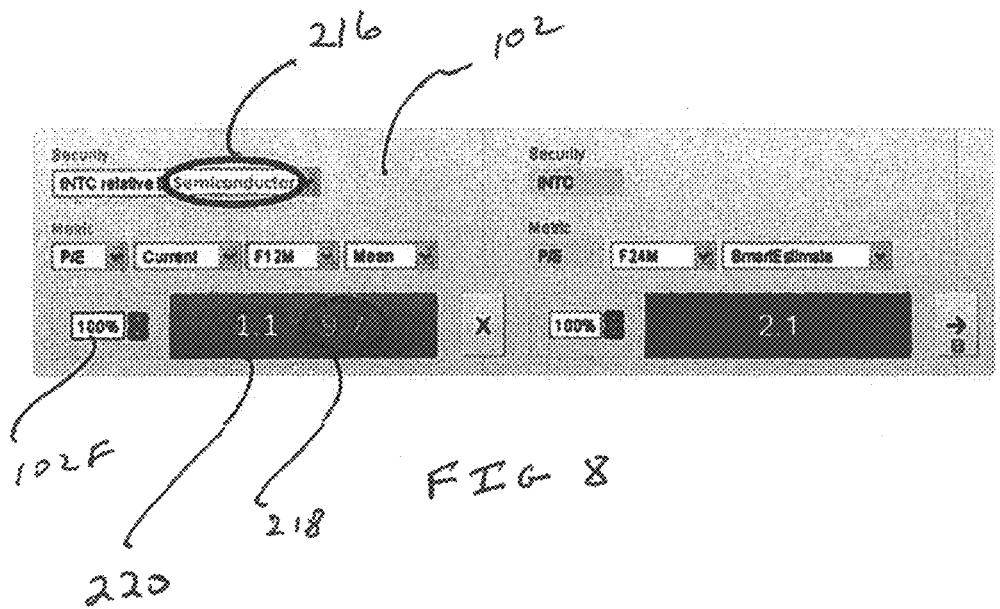

FIGS. 7 and 8 illustrate display differences in the GUI 100 between selection of the absolute mode 202A and the relative mode 202B. With respect to FIG. 7 and the discussion below, the terms "standard" and "absolute" are used interchangeable to refer to the absolute mode. Valuation multiple values using the relative mode differ from those using the absolute mode. In absolute mode, metric values are based on a ratio associated with the focus security. In relative mode, metric values are based on a ratio associated with a user selected security, industry or sector. For example, as shown in FIG. 7, upon selection of absolute mode and the security INTC from the pop-up dialog box 200, the valuation pane 102 displays INTC's P/E value of 9.7. As shown in FIG. 8, upon selection of the relative mode and selection of sector associated with the security INTC from the pop-up dialog box, INTC's P/E is displayed as 1.1 times that of the semiconductor industry, which may be adjusted via the provided multiple spinner control 102F.

Further, graphical clues may be provided in the GUI showing differences between absolute mode and relative mode. For example, as shown in FIG. 8, in one embodiment, the color display of text and number values associated relative mode values differs from text and number values associated with absolute mode values.

Figure 9:
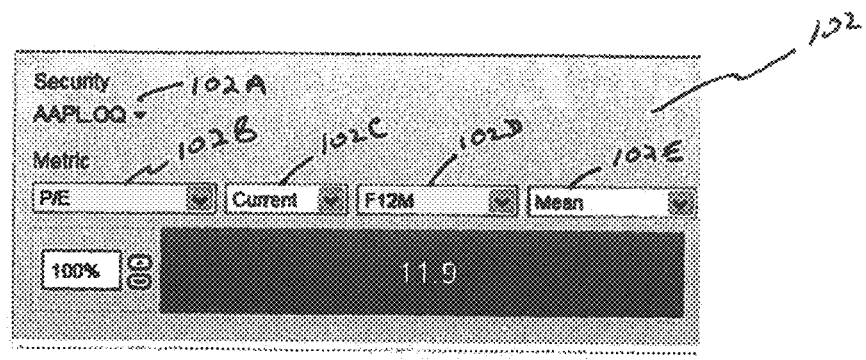
Figure 10A:
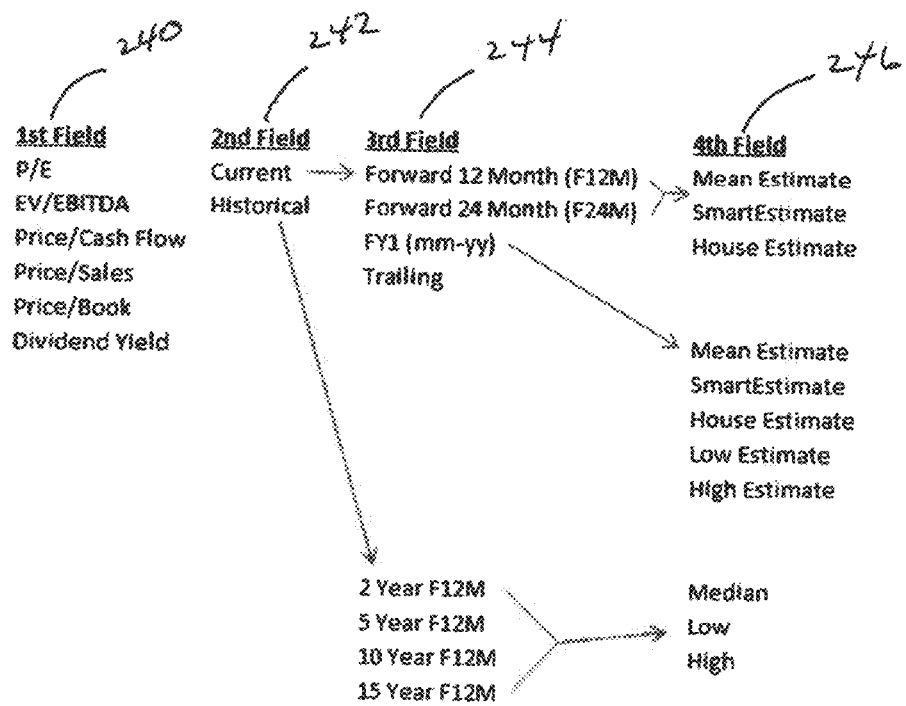
Figure 10B:
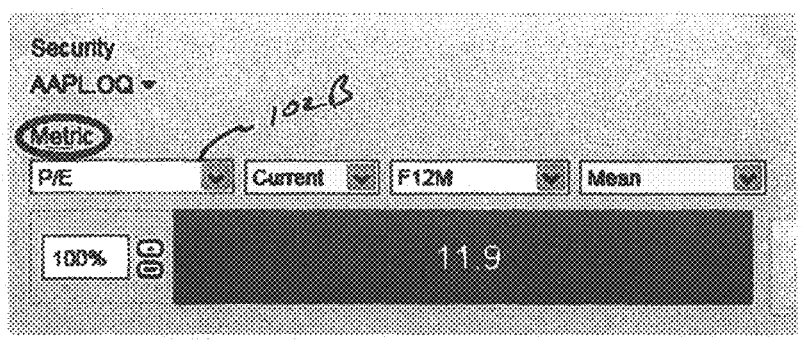
Figure 10B:
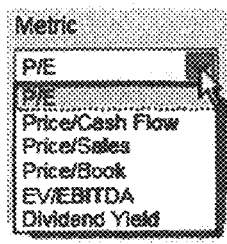

FIGS. 9 and 10A disclose additional details of valuation metric selection provided by the interface module 32. As shown in FIG. 9 and discussed in connection with FIG. 3, in one embodiment, the valuation pane 102 includes four (4) metric dropdown lists 102B-E.

In one embodiment, each of the items included in the metric dropdown lists 102B-E may have zero to many dependencies. For example, as shown in the chart of FIG. 10A, the first metric dropdown list 240 corresponding to 102B of FIG. 9 may include, but is not limited to, the following items: "P/E", "EV/EBITDA", "Price/Cash Flow", "Price/Sales", "Price/Book", and "Dividend Yield". Additional items may include "PEG", "EV/Sales" and "PVA".

In one embodiment, upon selection of the "PEG" item, the user is provided a time period selection for the growth rage. The target module 24 then obtains the PEG ratio value for the selected time period and applies the same to the EPS value to compute a price target. Default settings for the PEG ratio, selected time period, and EPS value may also be established. For example, in one embodiment, default settings for PEG metric is set to "1.00", the next twelve (12) month period is set for the selected time period, and EPS value is set to a mean EPS estimate.

In one embodiment, upon selection of the "Price/IV" item, the user is provided data from a Starmine Intrinsic Valuation model which the target module 24 uses to compute the price target. Similar to other valuation metrics discussed previously, the user is provided the ability to adjust the value of the IV (default value may be set to "1.0") to use in computing the price target.

The second metric dropdown list 242 corresponding to 102C of FIG. 9 may include, but is not limited to, the following items: "Current" and "Historical". In one embodiment, selections from the second metric dropdown list 242 determine what metrics items are to be available in the third metric dropdown list 244. For example, as shown in the FIG. 10A example, upon selection of the "Current" item in the second metric dropdown list 242, the third metric dropdown list 244 corresponding to 102D of FIG. 9 is populated with the following items: "Forward 12 Month (F12M)", "Forward 24 Month (F24M)", "FY1 (mm-yy)" and "Trailing".

Alternatively, upon selection of the "Historical" item in the second metric dropdown list 242, the following items are populated by the interface module 32 in the third metric dropdown list: "2 Year F12M", "5 Year F12M", "10 Year F12M", and "15 Year F12M". Likewise, as shown in FIG. 10A, subsequent selections from the third metric dropdown list 244 may cause different items to be populated in the fourth metric dropdown list 246.

In one embodiment, the second metric dropdown list 242 includes a "Fixed Value" option (not shown). Upon selection of the "Fixed Value" option, the user may define a value to use for any of the metrics shown in the first metric dropdown list 240. This user-defined value may then be utilized by the target module 24 to compute the price target and may remain unchanged once set initially.

Figure 11:
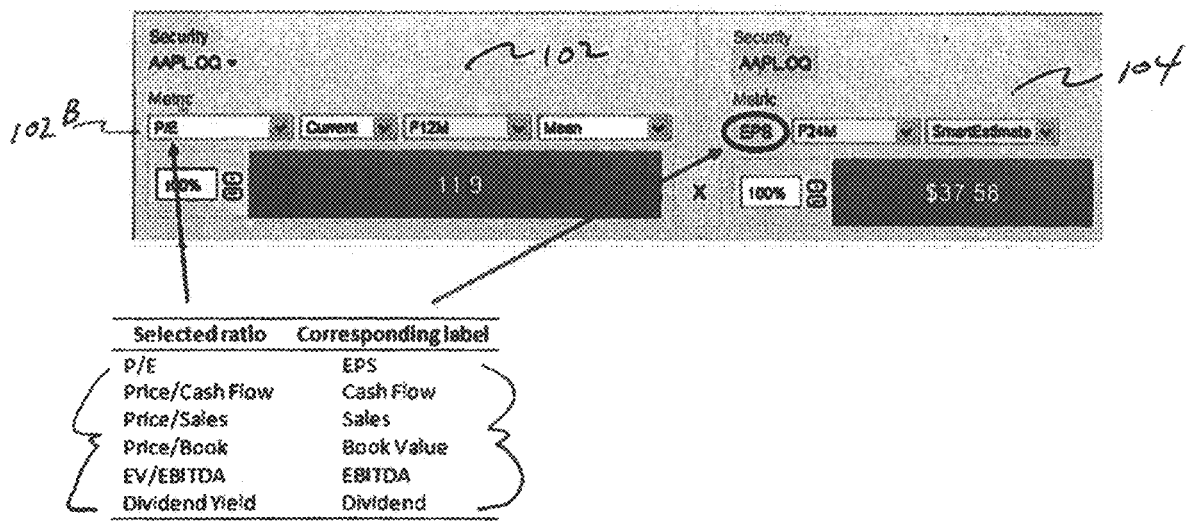
Figure 12:
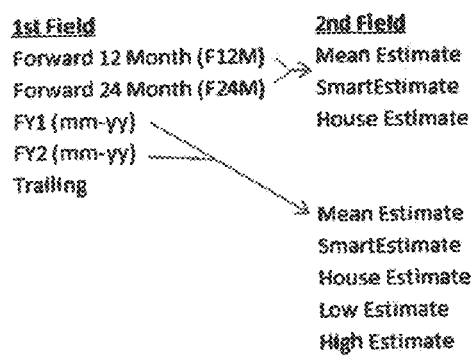

In one embodiment, items selected from metric dropdown lists 102B-E may also cause different estimate and/or fundamental metrics 104A-104B to be automatically displayed in the estimates pane 104. For example, in one embodiment, referring now to FIGS. 10B and 11, upon selection of the "P/E" metric ratio from the first metric dropdown list 102B, the interface module 32 automatically selects an estimate label 240 for display in the estimate pane 104 and populates the pull-down lists 104A-B discussed previously with relevant estimate and/or fundamental metric items. Similar to the metric dropdown lists 102B-E discussed previously, items selected in the first pull-down list 104A may cause different items to be populated in the second pull-down list 104 B. FIG. 11 illustrates example first metric dropdown list items 240 with corresponding estimate labels 242, and FIG. 12 illustrates example selections of the first pull-down list 104A and subsequent items populated in the second pull-down list 104B based on the selection.

Figure 13:
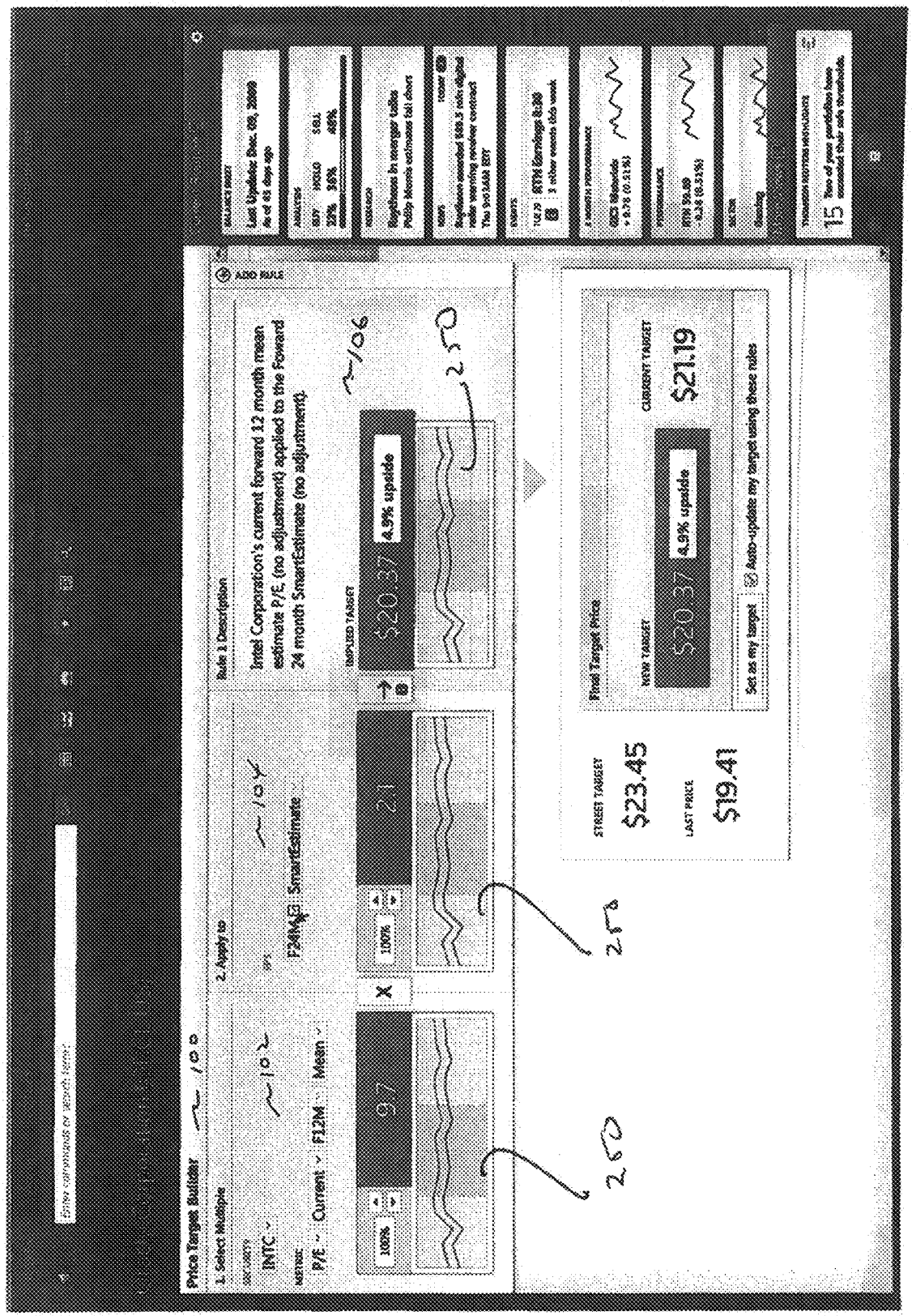

Turning now to FIG. 13, in one embodiment, the interface module 32 also provides chart integration into the GUI 100. For example, as shown in the FIG. 13 example, each of the valuation pane 102, the estimate pane 104, and the implied target pane 106 include charts 250 for displaying graphically changes in valuation multiples and estimates data used in defined rules over time, as well as how resulting implied target prices based on each rule and overall price target have changed over time.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A computer-implemented method for generating and displaying an updated price target of an investment asset based on a change in one or more sets of valuation metrics of the investment asset, the method comprising:
    identifying a first set of valuation metrics for association with the investment asset, wherein at least one item of the first set of valuation metrics identifies an index value, a sector value, or peer asset value;
    identifying a first set of values to be associated with the first set of valuation metrics, said identifying comprises determining whether a given valuation metric is a current valuation metric or a historical valuation metric, wherein:
        if the given valuation metric is the historical valuation metric, obtaining a historical data set based on a latest time series associated with the given valuation metric and computing a summary metric of the historical data set,
        if the given valuation is the current valuation metric, determining whether the current valuation metric is a peer based valuation metric, the peer based valuation metric based on one or more assets having similar characteristics, wherein:
            if the current valuation metric is the peer based valuation metric, obtaining a peer data set and computing an overall peer metric based on one or more valuation multiples associated with each peer of the peer data set, and
            if the current valuation metric is not the peer based valuation metric, obtaining a current value based on the most recent value associated with the current valuation metric,
    identifying a second set of values to be associated with a second set of valuation metrics;
    generating one or more rules defining a relationship between one of the first set of valuation metrics and one of a second set of valuation metrics, the one or more rules further comprising one or more textual descriptions of the one or more rules for presentation on a graphical user interface (GUI);
    configuring the GUI to display, selectable options to make adjustments to the identified first set of values associated with the first set of valuation metrics and the identified second set of values associated with the second set of valuation metrics;
    applying the one or more rules to compute an implied price target for each one of the one or more rules, wherein the applying the one or more rules includes:
        generating a price target by applying a first mathematical function to the one or more implied price targets associated with the one or more of the rules, wherein applying the first mathematical function includes averaging the one or more implied price targets to compute the price target;
    detecting a change in value of either the first set of values or the second set of values;
    generating the updated price target in response to detecting the change in value of either the first set of values or the second set of values, wherein the generating includes re-computing, in real-time, a value of the price target that is based on the one or more rules, the first mathematical function, and the change in value of either the first set of values or the second set of values; and
    generating a graphical display in the GUI to illustrate value changes associated with at least one of the first set of values, the second set of values, and the price target over a time period.

2. The method of claim 1, wherein the rule is a user configurable rule.

3. The method of claim 1, further comprising associating a set of permissions with the one or more rules.

4. The method of claim 1, further comprising determining the second set of valuation metrics based upon the first set of valuation metrics.

5. The method of claim 4, wherein at least one item of the first set of valuation metrics comprises an absolute valuation multiple or a relative valuation multiple.

6. The method of claim 1, further comprising associating a set of permissions with the updated price target.

7. The method of claim 1, wherein the applying first mathematical function further includes weighting each of the plurality of implied price targets by a corresponding weight value.

8. The method of claim 1, further comprising providing the graphical user interface (GUI) for selecting the first set of valuation metrics and the second set of valuation metrics.

9. The method of claim 1, comprising converting the updated price target from a first currency to a second currency, the first currency different from the second currency.

10. A computer device comprising: a processor, a computer memory operatively coupled to the processor, the computer memory storing instructions that, in response to receiving a request to generate and display an updated price target of an investment asset based on a change in one or more sets of valuation metric values of the investment asset, cause the processor to:
  identify a first set of valuation metrics for association with the investment asset, wherein at least one item of the first set of valuation metrics identifies an index value, a sector value, or peer asset value;
  identify a first set of values to be associated with the first set of valuation metrics, said identification comprising determining whether a given valuation metric is a current valuation metric or a historical valuation metric, wherein:
    if the given valuation metric is the historical valuation metric, obtain a historical data set based on a latest time series associated with the valuation metric and computing a summary metric of the historical data set,
    if the given valuation is the current valuation metric, determine whether the current valuation metric is a peer based valuation metric, the peer based valuation metric based on one or more assets having similar characteristics, wherein:
      if the current valuation metric is the peer based valuation metric, obtain a peer data set and computing an overall peer metric based on one or more valuation multiples associated with each of peer the peers of the peer data set, and
      if the current valuation metric is not the peer based valuation metric, obtain a current value based on the most recent value associated with the current valuation metric,
  identify a second set of values to be associated with a second set of valuation metrics;
  generate one or more rules defining a relationship between one of the first set of valuation metrics and one of a second set of valuation metrics, the one or more rules further comprising one or more textual descriptions of the one or more rules for presentation on a graphical user interface (GUI);
  configure the GUI to display selectable options to make adjustments to the identified first set of values associated with the first set of valuation metrics and the identified second set of values associated with the second set of valuation metrics;
  apply the one or more rules to compute an implied price target for each one of the one or more rules, wherein the instructions that cause the processor to apply the one or more rules include instructions that cause the processor to:
    generate a price target by applying a first mathematical function to the one or more implied price targets associated with the one or more rules, the instructions that cause the processor to apply the first mathematical function include instructions that cause the processor to average the one or more implied price targets to compute the price target;
  detect a change in value of either the first set of values or the second set of values;
  generate the updated price target in response to detecting the change in value of either the first set of values or the second set of values using the one or more rules, wherein the instructions that cause the processor to generate the updated price include instructions that cause the processor to re-compute, in real-time, a value of the updated price target that is indicative of one or more rules, the first mathematical function, and the change in value of either the first set of values or the second set of values; and
  generate a graphical display in the GUI to illustrate value changes associated with the at least one value of the first set of values, the second set of values, and the price target over a time period.

11. The system of claim 10, wherein the rule is a user configurable rule.

12. The system of claim 10, wherein the memory stores instructions that, in response to receiving the request, cause the processor to associate a set of permissions with the one or more rules.

13. The system of claim 10, wherein the memory stores instructions that, in response to receiving the request, cause the processor to transmit a signal representing the stored updated price target in response to a request.

14. The system of claim 10, wherein the memory stores instructions that, in response to receiving the request, cause the processor to determine the second set of valuation metrics based upon the first set of valuation metrics.

15. The system of claim 14, wherein at least one item of the first set of valuation metrics comprises an absolute valuation multiple or a relative valuation multiple.

16. The system of claim 10, wherein the memory stores instructions that, in response to receiving the request, cause the processor to associate a set of permissions with the updated price target.

17. The system of claim 10, wherein the memory stores instructions that, in response to receiving the request to apply the first mathematical function, further cause the processor to weight each of the plurality of implied price targets by a corresponding weight value.

18. The system of claim 10, wherein the memory stores instructions that, in response to receiving the request, cause the processor to provide the graphical user interface (GUI) for selecting the first set of valuation metrics and the second set of valuation metrics.

19. The system of claim 10, wherein the memory stores instructions that, in response to receiving the request, cause the processor to convert the updated price target from a first currency to a second currency, the first currency different from the second currency.

* * * * *